(12) United States Patent
Morgenroth et al.

(10) Patent No.: US 9,643,843 B2
(45) Date of Patent: May 9, 2017

(54) METHOD FOR PRODUCING SYNTHESIS GAS

(75) Inventors: Rainer Morgenroth, Hattstedt (DE); Andreas Bormann, Frankfurt am Main (DE)

(73) Assignee: AIR LIQUIDE GLOBAL E&C SOLUTIONS GERMANY GMBH, Frankfurt am Main (DE)

( * ) Notice: Subject to any disclaimer, the term of this patent is extended or adjusted under 35 U.S.C. 154(b) by 80 days.

(21) Appl. No.: 14/345,270

(22) PCT Filed: Jun. 8, 2012

(86) PCT No.: PCT/EP2012/002430
§ 371 (c)(1),
(2), (4) Date: Mar. 17, 2014

(87) PCT Pub. No.: WO2013/041157
PCT Pub. Date: Mar. 28, 2013

(65) Prior Publication Data
US 2015/0041721 A1    Feb. 12, 2015

(30) Foreign Application Priority Data
Sep. 20, 2011   (DE) .................. 10 2011 113 699

(51) Int. Cl.
*C01B 3/38* (2006.01)

(52) U.S. Cl.
CPC ............. *C01B 3/386* (2013.01); *C01B 3/382* (2013.01); *C01B 2203/0205* (2013.01);
(Continued)

(58) Field of Classification Search
USPC ........................................................ 252/373
See application file for complete search history.

(56) References Cited

U.S. PATENT DOCUMENTS

| 4,854,943 A | 8/1989 | Voeste et al. |
| 4,927,857 A | 5/1990 | McShea, III et al. |

(Continued)

FOREIGN PATENT DOCUMENTS

| DE | 3800862 A1 | 7/1989 |
| DE | 3806408 A1 | 9/1989 |

(Continued)

OTHER PUBLICATIONS

The Engineering ToolBox—Fuels and Chemicals—Autoignition Temperatures, 2015.*

(Continued)

*Primary Examiner* — Melvin C Mayes
*Assistant Examiner* — Kenneth Vaden
(74) *Attorney, Agent, or Firm* — Leydig, Voit & Mayer, Ltd.

(57) ABSTRACT

A method for reforming hydrocarbon-containing feed gas into synthesis gas, involving processing of the feed gas by pre-reforming at least partially converting one or more higher hydrocarbons into methane, and heating the feed gas by exothermic catalytic partial oxidation of hydrocarbons before the introduction thereof into the main reforming zone, and, subsequent to the pre-reforming, reforming the pre-reformed product with the addition of a controlled quantity of an oxidizing agent.

16 Claims, 3 Drawing Sheets

(52) U.S. Cl.
CPC ............... *C01B 2203/0233* (2013.01); *C01B 2203/0244* (2013.01); *C01B 2203/0261* (2013.01); *C01B 2203/06* (2013.01); *C01B 2203/061* (2013.01); *C01B 2203/062* (2013.01); *C01B 2203/0833* (2013.01); *C01B 2203/1047* (2013.01); *C01B 2203/1064* (2013.01); *C01B 2203/1258* (2013.01); *C01B 2203/1264* (2013.01); *C01B 2203/141* (2013.01); *C01B 2203/142* (2013.01); *C01B 2203/143* (2013.01); *Y02P 20/52* (2015.11)

(56) References Cited

U.S. PATENT DOCUMENTS

| | | | |
|---|---|---|---|
| 5,310,506 | A | 5/1994 | Supp et al. |
| 7,381,230 | B2 | 6/2008 | Rapier et al. |
| 2004/0001983 | A1 | 1/2004 | Matos da Silva et al. |
| 2005/0173304 | A1 | 8/2005 | Kabashima et al. |
| 2006/0090395 | A1* | 5/2006 | Rode et al. ............ 48/61 |
| 2007/0124997 | A1* | 6/2007 | Liu et al. .............. 48/198.7 |
| 2008/0229662 | A1 | 9/2008 | Aicher et al. |
| 2009/0064582 | A1 | 3/2009 | Malhotra et al. |
| 2009/0077890 | A1* | 3/2009 | Pearson ............... B01J 8/0438 48/127.9 |
| 2009/0133676 | A1* | 5/2009 | Lepsch et al. .......... 123/549 |
| 2011/0168604 | A1* | 7/2011 | van Egmond et al. ...... 208/57 |

FOREIGN PATENT DOCUMENTS

| | | |
|---|---|---|
| DE | 4130718 A1 | 3/1993 |
| DE | 19860308 A1 | 8/2000 |
| DE | 102005001261 A1 | 8/2005 |
| DE | 102004041815 A1 | 3/2006 |
| DE | 10392845 B4 | 4/2007 |
| DE | 102005048385 A1 | 4/2007 |
| DE | 102008039014 A1 | 2/2010 |
| EP | 1188713 A2 | 2/2010 |
| WO | WO 2007137068 A1 | 11/2007 |
| WO | WO 2008/122399 * | 10/2008 |

OTHER PUBLICATIONS

Ullmann's Encyclopedia if Industrial Chemistry, Sixth Edition, Bd. 15, Gas Production, Chap. 2.4.3., Fig. 9 and Chap. 7.1., Fig. 79.

* cited by examiner

METHOD FOR PRODUCING SYNTHESIS GAS

CROSS-REFERENCE TO RELATED APPLICATIONS

This application is a U.S. National Phase Application under 35 U.S.C. §371 of International Application No. PCT/EP2012/002430, filed on Jun. 8, 2012, and claims benefit to German Patent Application No. DE 10 2011 113 699.5, filed on Sep. 20, 2011. The International Application was published in German on Mar. 28, 2013, as WO 2013/041157 A1 under PCT Article 21(2).

FIELD

The invention relates to a process for producing synthesis gas from hydrocarbonaceous feed gas, such as natural gas, comprising a treatment of the feed gas and, subsequent thereto, a main reforming step carried out in a main reforming zone. The treatment of the feed gas includes a prereforming step which is carried out in a prereforming zone.

The term synthesis gas here substantially should encompass gas comprising carbon monoxide and hydrogen for use, e.g., for the ammonia, methanol, oxo or Fischer-Tropsch synthesis.

BACKGROUND

Processes for producing synthesis gas by treatment and reformation of a hydrocarbonaceous feed gas, such as natural gas or evaporated naphtha, are known and are described for example in Ullmann's Encyclopedia of Industrial Chemistry, Sixth Edition, Vol. 15, Gas Production.

The treatment of the feed gas starts, if required, with a process step for removing sulfur-containing constituents. The suitable processes are known to the skilled person. To not impair the service lives of the catalysts used in the succeeding process stages, the sulfur content of the feed gas should lie below 0.1 ppm.

Then, a process step referred to as prereforming takes place, in which a part of the higher hydrocarbons contained in the feed gas with carbon numbers greater than 1 is catalytically reformed with steam to obtain methane. Due to this measure, the formation of soot in the succeeding reforming reactor can be reduced.

The feed gas is introduced into the preformation with temperatures of typically about 500° C. and, after conversion of the higher hydrocarbons into methane, leaves the same for example with about 470° C.

The prereforming step then is followed by a main reforming step, which usually is carried out in a steam reformer (SMR) or an autothermal reformer (ATR). It is also possible to combine the two last-mentioned reforming techniques with each other in the main reforming step (so-called Combined Reforming) Since the conversion thus can be effected in several reactors, the part of the process in which the main reforming step takes place subsequently is unifyingly referred to as main reforming zone. As essential difference between the prereformation and the main reforming step it is found that during the main reformation the conversion of the hydrocarbons to the synthesis gas constituents largely is effected depending on the position of the corresponding reaction equilibrium.

To operate the main reforming zone efficiently in terms of energy yield and utilization of the reactor volume, it is required that the feed gas is introduced with a temperature which comes as close as possible to the process temperature in the reforming reactor. Usually, the process temperature is above 850° C. in the main reforming zone.

According to the prior art known so far, the temperature increase of the feed gas is effected between the prereforming step and the main reforming step by indirect heating by means of one or more heat exchangers, cf. Ullmann's Encyclopedia of Industrial Chemistry, Sixth Edition, Vol. 15, Gas Production, Chap. 2.4.3., FIG. 9 and Chap. 7.1, FIG. 79.

In this method for heating the feed gas it is disadvantageous that with an economically justifiable investment effort using heat exchangers or fired heaters the gas temperature merely can be heated up to about 650° C., so that a large part of the gas heating still must be effected in the main reforming zone itself.

In the main reforming zone, the conversion of the hydrocarbonaceous feed gas is effected either in a steam reformer or in an autothermal reformer. In the steam reformer, steam is added to the feed gas as reactant, whereas for the conversion in the ATR a defined amount of oxygen in the form of air, oxygen-enriched air or pure oxygen also is added in addition to the steam. In the steam reformer, the input of the additionally required thermal energy is effected by burners located outside the reformer tubes in a reformer furnace, whereas in the ATR the one or more burners are located in the reactor interior, where they provide for the input of the thermal energy required for the reformation by means of substoichiometric combustion of a part of the feed gas with the added oxygen. Because of the above-described low gas inlet temperature, special measures are required in the latter case, in order to start and maintain the steam reformation by igniting the burner.

To trigger the ignition of the reformer burner, hydrogen also is admixed to the feed gas in practice in addition to the reactants steam and oxygen before entry into the reactor, in order to lower the ignition temperature of the gas. Other or additional theoretical possibilities include the use of an ignition catalyst or auxiliary ignition burners or pilot burners in the reactor, cf. DE 41 30 718 A1 and DE 3 800 862 A1. In the reactor however the ignition catalyst is exposed to temperatures too high to remain operable for a long period. Additional pilot burners have a very expensive construction, require frequent maintenance and incur high additional investment costs. A third, so far only theoretical possibility would be the sufficient preheating of the gas to a temperature above 700° C., which however, as explained already, is not possible with an economically justifiable expenditure in the methods of gas heating by means of heat exchangers or fired heaters commonly used so far in the art.

SUMMARY

An aspect of the invention provides a process for producing synthesis gas from hydrocarbonaceous feed gas. The process includes: prereforming the feed gas comprising a higher hydrocarbon, in a prereforming zone, to at least partly convert the higher hydrocarbon into methane; heating the feed gas, before introduction of a pre-reformed effluent into a main reforming zone, by exothermal catalytic partial oxidation of the hydrocarbon under partial oxidation conditions and by adding a controlled amount of an oxidizing agent, to obtain the pre-reformed effluent; and reforming the pre-reformed effluent, to obtain a synthesis gas comprising a carbon oxide and hydrogen, in the main reforming zone.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
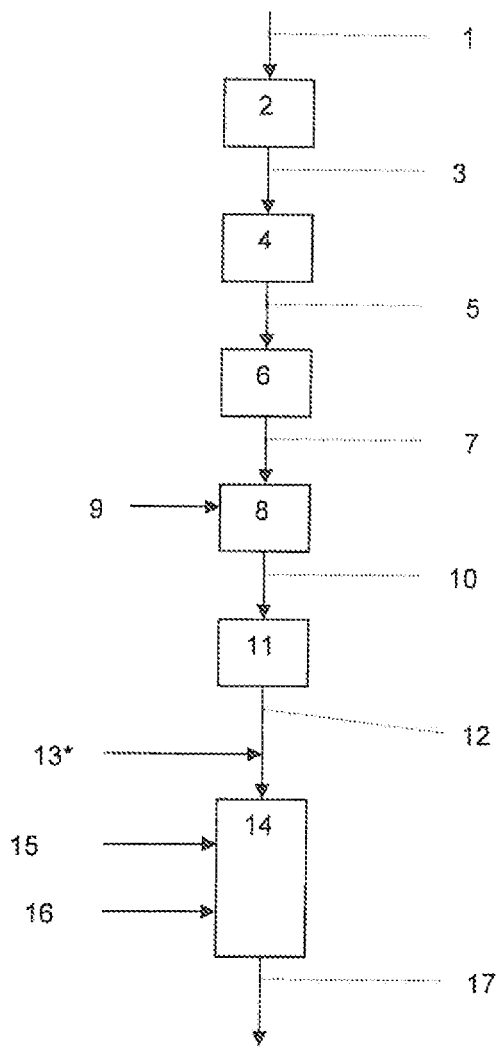
FIG. 1 by way of example shows a schematic flow diagram of the process according to the prior art.

Partial oxidation is understood to be the substoichiometric exothermal oxidation of a part of the hydrocarbons contained in the feed gas with a minor amount of oxidizing agent added before entry of the feed gas into the main reforming zone. The oxidizing agent generally comprises oxygen; a part of the hydrocarbons is burnt by releasing heat. The partial oxidation is carried out in the presence of a suitable catalyst and in a separate reactor located downstream directly before the main reforming zone. To trigger the partial oxidation, the feed gas is enriched with the oxidizing agent and there is used a catalyst which acts as so-called ignition catalyst by starting the partial oxidation already at a gas temperature above about 450° C. Suitable catalysts in particular include those which as active component contain at least one metal of the groups 8, 9 or 10 (sub-group VIII) of the Periodic Table. In general, these are platinum metals such as rhodium, palladium or platinum. The metal can be contained in the catalyst in metallic and/or oxidic form. For example, rhodium in the form of rhodium dioxide was found to be quite useful; it is, however, also possible to replace at least a part of the expensive noble metals by less expensive metals such as nickel. The catalyst used for the exothermal catalytic partial oxidation can be present as bed of granular solids, as monolith or as metal mesh, onto which or into which the active components have been applied or incorporated in a suitable way known to the skilled person.

The chemical reactions taking place during the partial oxidation in total proceed exothermally. By adjusting the added amount of the oxidizing agent, for example the amount of oxygen, the extent of the partial oxidation and hence the temperature increase of the feed gas can be adjusted and controlled. This provides the opportunity to automate the execution of the partial oxidation for example by means of a process control system, wherein the desired end temperature or temperature increase of the feed gas before entry into the main reforming zone serves as regulating variable and the added amount of oxidizing agent serves as correcting variable.

By applying the process according to the invention, it is possible in an economic way to adjust the gas inlet temperature into the succeeding main reforming zone so high that it no longer is necessary to use valuable reactor space for heating the gas. In this way, the capacity of existing reforming reactors can be increased. Furthermore, the used ignition catalysts have a longer service life, as they are not arranged, as previously proposed in the prior art, within the main reforming zone with its drastic temperature conditions.

Within the main reforming zone, the reforming reactors known from the prior art, in particular the steam reformer (SMR) and the autothermal reformer (ATR), can be used advantageously. The advantageous use of the invention also is conceivable in connection with other reforming reactors or in combinations or interconnections of said reforming reactors. When the main reforming zone consists of a steam reformer, the energy supply in the reformer furnace can be reduced according to the invention. In the case of the use of an autothermal reactor as reforming reactor, the previously necessary addition of hydrogen to the feed gas for lowering the ignition temperature and/or the use of an ignition or pilot burner can be omitted. It is favorable that the temperature of the feed gas is raised by the exothermal catalytic partial oxidation to such an extent that the feed gas ignites spontaneously on entry into the autothermal reformer with the addition of additional oxygen. This is particularly advantageous, as hydrogen not always is easily available at the locations of these reforming plants, in particular before the same are put into operation.

Surprisingly, it was found that the inventive arrangement of the partial oxidation of the hydrocarbons in the feed gas before entry of the feed gas into the main reforming stage cooperates with the prereforming stage in an advantageous way. It is the objective of the prereforming stage to reduce the concentration of higher hydrocarbons in the feed gas by their partial conversion to methane, in order to prevent disadvantageous effects in the main reforming stage, for example the deposition of coke. Especially higher hydrocarbons, however, preferably are converted during the partial oxidation as compared to methane. When carrying out the partial oxidation, the concentration of higher hydrocarbons in the feed gas therefore decreases in addition, so that the disadvantageous effects of the higher hydrocarbons in the main reforming stage are even further reduced.

The invention also relates to a treatment device for the treatment of hydrocarbonaceous feed gas determined for reformation, characterized by a feed conduit for the feed gas, at least one fixed-bed reactor, at least one catalyst zone for the prereforming catalyst, at least one catalyst zone for the partial oxidation catalyst, at least one supply conduit for the oxidizing agent, and a discharge conduit for the treated feed gas to the main reforming zone.

A particular aspect of the invention consists in carrying out the heating of the feed gas by partial oxidation and the prereforming of the feed gas belonging to the treatment for converting higher hydrocarbons into methane in a common reactor. In this way, the space requirement can be reduced and investment costs can be saved by using a common reactor housing. An advantageous aspect of the invention provides to provide the catalysts for the prereformation and for the partial oxidation in separate beds, wherein the partial oxidation catalyst is arranged downstream of the prereforming catalyst and the oxidizing agent is added after the prereforming zone in flow direction. For designs in which the pressure loss of the arrangement should be minimized as far as possible, it is favorable to provide the partial oxidation catalyst not as bed of granular solids, but as monolith or as metal mesh.

Another particular aspect of the process according to the invention consists in that the catalysts for the partial oxidation and for the prereformation within the jointly used reactor housing are present in mixed form in at least one common fixed bed traversed by the feed gas. Both catalysts preferably are used as granular solids, for example as molded parts, briquettes or extrudate. It is also possible to guide the gas through several fixed beds one after the other, wherein the mixing ratio of the catalysts in the fixed beds each is adapted to the desired effect. The oxidizing agent can be added to the treatment zone before entry into the first catalyst bed or preferably distributed before entry into succeeding catalyst beds. This provides a high adaptability to the requirements of the part of the process carried out in the main reforming zone.

It was found to be particularly favorable to preheat the feed gas before carrying out the exothermal catalytic partial oxidation to an inlet temperature of at least 250° C., preferably at least 400° C., so that a light-off of the partial oxidation at the catalyst provided for this purpose can be effected. The light-off temperature depends on the space velocity of the feed gas based on the catalyst volume of the partial oxidation catalyst and on the concentration of higher hydrocarbons. The skilled person can easily determine inlet temperatures by routine experiments on the light-off temperature. In particular when the prereforming catalyst and the partial oxidation catalyst are arranged in a common reactor housing, the outlet temperature of the feed gas from the prereforming stage mostly is sufficient to ensure a safe light-off of the partial oxidation.

Further developments, advantages and possible applications of the invention can also be taken from the following description of exemplary embodiments and drawings. All features described and/or illustrated form the the invention per se or in any combination, independent of their inclusion in the claims or their back-reference.

In the following, the execution and further advantages of the process according to the invention as compared with the prior art will be explained with reference to drawings.

Process According to the Prior Art (Comparative Example)

FIG. 1 by way of example shows a procedure according to the prior art. Natural gas as feed gas (1 and 3) is heated by means of a heat exchanger (2) and desulfurized in the plant (4). Sulfur usually present in the form of hydrogen sulfide is removed from the gas. The conditions such as pressures, temperatures, catalysts used and space velocities applicable here and in the remaining process steps are contained in the prior art and known to the skilled person. In the following, they are only mentioned as far as they are necessary for the understanding of the differences between prior art and invention.

By means of heat exchangers (6) the gas temperature of the desulfurized feed gas (5) is adjusted to 500° C., and subsequently the desulfurized and preheated feed gas (7) is introduced into the prereforming zone (8). It is enriched there with steam (9), and a part of the higher hydrocarbons contained in the gas is catalytically converted into methane. The chemical reactions proceed endothermally and the process is carried out adiabatically. This leads to a slight lowering of the gas temperature, so that the feed gas (10) leaves the prereforming zone with a temperature of about 470° C. According to the current state of the art, the feed gas subsequently is heated indirectly, by means of one or more heat exchangers (11), to about 650° C. The succeeding main reforming step (14) in principle can be carried out in a steam reformer or an autothermal reformer. When an ATR is used, hydrogen (13*) is added to the feed gas (12) before entry into the main reforming zone and/or ignition burners are provided in addition.

Through a burner located in the head of the ATR, the feed gas then is introduced into the reformer. Furthermore, steam and oxygen are supplied to the ATR as reactants. The gas mixture exiting from the burner into the upper space of the reformer ignites by itself after addition of hydrogen, otherwise the ignition is effected by a non-illustrated ignition burner. The thermal energy obtained by reacting the hydrocarbons with the oxygen provides for the conversion of the feed gas to synthesis gas carried out catalytically in the reformer, which synthesis gas leaves the reformer as stream (17) for further treatment.

Process According to the Invention

Figure 2:
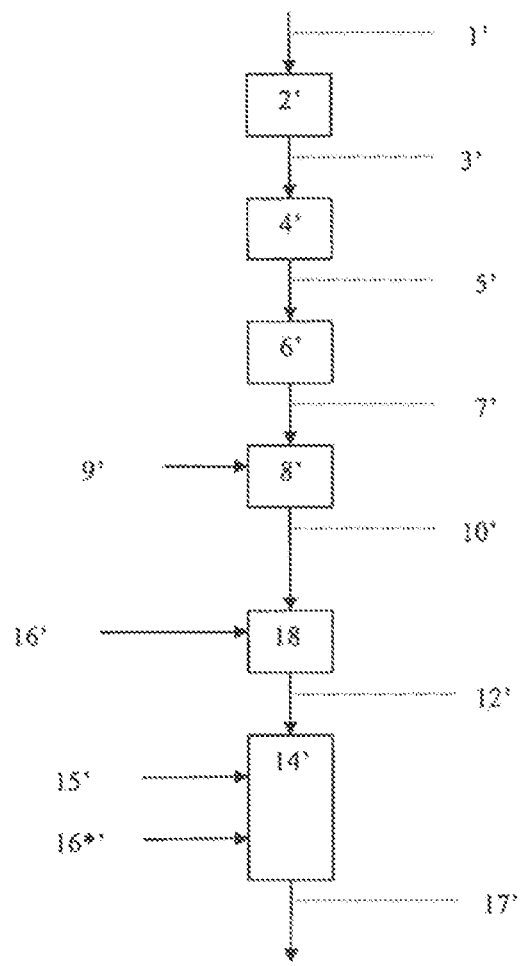
FIG. 2 shows a schematic flow diagram of the process according to the invention.

FIG. 2 shows a schematic flow diagram of the process according to the invention. The gas heating here is effected before entry into the main reforming zone by a partial oxidation (18) arranged downstream of the prereforming zone (8') with the addition of a substoichiometric amount of oxygen (16'). In the burner of the downstream ATR (14') the auto-ignition occurs after addition of further oxygen (16*'), without a further heating of the feed gas (12') by heat exchangers or fired heaters or the presence of an ignition burner being necessary.

Process According to the Invention, Further Preferred Aspect

Figure 3:
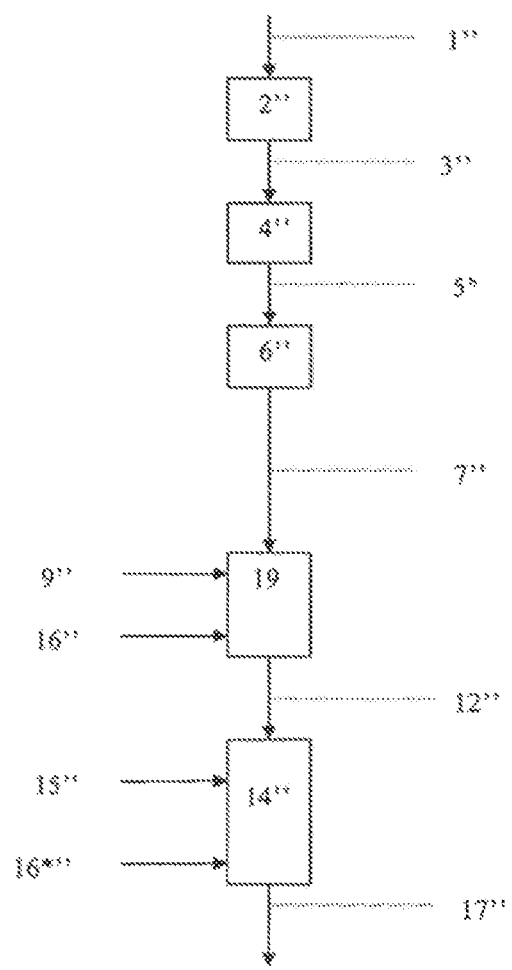
FIG. 3 shows a schematic flow diagram of a further preferred aspect of the process according to the invention.

FIG. 3 shows a schematic flow diagram of the process according to the invention, in which the heating by partial oxidation and the prereforming of the feed gas belonging to the treatment for converting higher hydrocarbons into methane is carried out in a common reactor (19).

The invention provides an economic process for producing synthesis gas by reforming hydrocarbonaceous gases such as natural gas or evaporated naphtha, which is particularly favorable with regard to the investment and energy or raw material costs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS (1, 1', 1") feed gas
(2, 2', 2") gas heating by indirect heat transfer
(3, 3', 3") feed gas
(4, 4', 4") desulfurization
(5, 5', 5") feed gas
(6, 6', 6") gas heating by indirect heat transfer
(7, 7', 7") feed gas
(8, 8', 8") prereformation (9, 9', 9") steam
(10, 10', 10") feed gas
(11) gas heating by indirect heat transfer
(12, 12', 12") feed gas
(13*) hydrogen, only used for steam reformation by means of autothermal reactor
(14, 14', 14") steam reformation
(15, 15', 15") steam
(16', 16") oxygen
(16*, 16*', 16*") oxygen, only used for autothermal reformation
(17, 17', 17") synthesis gas
(18) gas heating by partial oxidation
(19) gas heating by partial oxidation and prereformation

The invention claimed is:

1. A process for producing synthesis gas from hydrocarbonaceous feed gas, the process comprising:
    prereforming the feed gas comprising a higher hydrocarbon, in a prereforming zone, at a temperature in a range of from 470 to 500° C., to at least partly convert the higher hydrocarbon into methane; and
    heating the feed gas, before introduction of a pre-reformed effluent into a main reforming zone, by exothermal catalytic partial oxidation of the hydrocarbon under partial oxidation conditions and by adding a controlled amount of an oxidizing agent, to obtain the pre-refomied effluent; and
    reforming the pre-reformed effluent in a separate reactor from the prereforming zone, to obtain a synthesis gas comprising a carbon oxide and hydrogen, in the main reforming zone,
    wherein catalysts for the exothermal catalytic partial oxidation and for the prereforming are present in at least one common fixed bed traversed by the feed gas.

2. The process of claim 1, Wherein the main reforming zone comprises a steam reformer (SMR), an autothermal reformer (ATR), or combinations or interconnections of both.

3. The process of claim 2, wherein the autothermal reformer is present and a feed gas temperature is raised by the exothermal catalytic partial oxidation to such an extent that the pre-reformed effluent ignites spontaneously on entry into the autothermal reformer with the addition of additional oxygen.

4. The process of claim 1, wherein the oxidizing agent comprises air, oxygen-enriched air, or oxygen.

5. The process of claim 1,
    wherein the catalysts comprise a metal of periodic table group 8, 9, or 10 (sub-group VIII), or a mixture of two or more of any of these.

6. The process of claim 1, wherein, before carrying out the exothermal catalytic partial oxidation, the feed gas is pre-heated to a temperature of at least 250° C.

7. The process of claim 1, wherein a feed gas temperature increase effected by the exothermic catalytic partial oxidation is controlled by an added amount of the oxidizing agent.

8. The process of claim 1, wherein the catalysts comprise rhodium.

9. The process of claim 1, wherein the catalysts comprise rhodium dioxide.

10. The process of claim 1, wherein, before carrying out the exothermal catalytic partial oxidation, the feed gas is preheated to a temperature of at least 400° C.

11. The process of claim 1, wherein the main reforming zone comprises a steam reformer (SMR).

12. The process of claim 1, wherein the main refhrming zone comprises an autothermal reformer (ATR).

13. The process of claim 1, wherein the main reforming zone comprises a steam reformer (SMR) and an autothermal reformer (ATR) in series.

14. The process of claim 1, wherein all the pre-reformed effluent is passed to the separate reactor from the prereforming zone.

15. The process of claim 1, wherein the feed gas comprises evaporated naphtha.

16. The process of claim 1, wherein the catalysts comprise nickel.

* * * * *